US012619709B2

(12) United States Patent
Courington et al.

(10) Patent No.: US 12,619,709 B2
(45) Date of Patent: May 5, 2026

(54) BLOCKCHAIN-BASED METHOD AND SYSTEM FOR SECURING A NETWORK OF VIRTUAL WIRELESS BASE STATIONS

(71) Applicant: John Mezzalingua Associates, LLC, Liverpool, NY (US)

(72) Inventors: Jeffrey Courington, Chester, VA (US); Francesco Foresta, Faenza (IT); Vishal Agrawal, Vernon Hills, IL (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 488 days.

(21) Appl. No.: 17/638,505

(22) PCT Filed: Aug. 28, 2020

(86) PCT No.: PCT/US2020/048575
§ 371 (c)(1),
(2) Date: Feb. 25, 2022

(87) PCT Pub. No.: WO2021/041937
PCT Pub. Date: Mar. 4, 2021

(65) Prior Publication Data
US 2022/0405384 A1 Dec. 22, 2022

Related U.S. Application Data

(60) Provisional application No. 62/893,410, filed on Aug. 29, 2019.

(51) Int. Cl.
*G06F 21/53* (2013.01)

(52) U.S. Cl.
CPC ........ *G06F 21/53* (2013.01); *G06F 2221/031* (2013.01)

(58) Field of Classification Search
CPC ..... H04W 16/14; H04W 16/16; H04W 16/02; H04W 72/04; H04W 72/0446; H04W 72/0453; H04W 72/20; H04W 88/08
See application file for complete search history.

(56) References Cited

U.S. PATENT DOCUMENTS

| | | | |
|---|---|---|---|
| 2014/0020107 A1* | 1/2014 | Dodgson | G06F 21/10 |
| | | | 726/26 |
| 2014/0136427 A1* | 5/2014 | Koka | G06Q 50/184 |
| | | | 705/310 |

(Continued)

FOREIGN PATENT DOCUMENTS

CN 109792446 A 5/2019

OTHER PUBLICATIONS

Herbert et al., "A Novel Method for Decentralised Peer-to-Peer Software License Validation Using Cryptocurrency Blockchain Technology," Proceedings of the 38th Australasian Computer Science Conference (ACSC 2015), Jan. 30, 2015, pp. 27-35, XP055543368.

(Continued)

*Primary Examiner* — Tae K Kim
(74) *Attorney, Agent, or Firm* — BRYAN CAVE LEIGHTON PAISNER LLP

(57) ABSTRACT

Disclosed is a system for securing a wireless telecommunications network that is capable of distributing licensed capacity (in the form of connection licenses) to respond to localized fluctuations in demand. The system includes a master license server and a plurality of local license servers. The local license servers are coupled to a plurality of virtual wireless base stations over a bus. Each of the local license servers has a blockchain implementation that secures the virtual wireless base stations. For example, the blockchain (Continued)

implementation logs each transaction in which connection licenses change ownership among the virtual wireless base stations.

27 Claims, 9 Drawing Sheets

(56) References Cited

U.S. PATENT DOCUMENTS

| | | | |
|---|---|---|---|
| 2015/0356279 A1 | 12/2015 | Montana et al. | |
| 2016/0112742 A1 | 4/2016 | Skarp | |
| 2016/0259923 A1* | 9/2016 | Papa ..................... | H04W 12/35 |
| 2017/0228247 A1* | 8/2017 | Aron ..................... | G06F 9/5072 |
| 2018/0189755 A1 | 7/2018 | Kilpatrick et al. | |
| 2019/0069187 A1* | 2/2019 | Ashrafi ............... | H04L 41/5054 |
| 2019/0251532 A1* | 8/2019 | Segal ................... | G06Q 20/389 |
| 2020/0029250 A1* | 1/2020 | Ibek ................... | H04L 41/5009 |
| 2020/0382963 A1* | 12/2020 | Mueck ................ | H04W 16/04 |
| 2021/0153029 A1* | 5/2021 | Mueck ................ | H04W 16/14 |
| 2021/0168804 A1* | 6/2021 | Cimpu ................ | H04W 16/14 |
| 2021/0195484 A1* | 6/2021 | Khawer ............... | H04W 36/32 |
| 2021/0243612 A1* | 8/2021 | Kempf ................ | H04W 28/18 |

OTHER PUBLICATIONS

Menezes et al., "Handbook of Applied Cryptography, Key Management Through Public-Key Techniques," Jan. 1, 1997, Handbook of Applied Cryptography, pp. 37-39, 547, XP002245431.

* cited by examiner

200

Instantiate
elements ⟋ 205

MLS extra PKI
l/c /LLSs ⟋ 210

Bus Master
Validates eNBs ⟋ 215

MLS obtains
licenses ⟋ 220

MLS distributes
to LLSs ⟋ 225

LLSs distribute
to eNBs ⟋ 230

BLOCKCHAIN-BASED METHOD AND SYSTEM FOR SECURING A NETWORK OF VIRTUAL WIRELESS BASE STATIONS

RELATED APPLICATION

This application is the National Stage filing under 35 U.S.C. 371 of International Application No. PCT/US2020/048575 filed on Aug. 28, 2020, which claims the benefit of U.S. Provisional Application No. 62/893,410 filed on Aug. 29, 2019, the contents of which are all hereby incorporated by reference herein in their entirety.

BACKGROUND OF THE DISCLOSURE

Field of the Disclosure

The present disclosure relates to wireless communications, and more particularly, to a method and system for securing networks of virtual wireless base stations.

Related Art

The advent of pure software virtual wireless base stations holds the promise of vast flexibility and efficiencies, given that the virtual wireless base stations can be hosted on general-purpose server hardware, and that individual virtual wireless base stations can be instantiated and de-instantiated as network traffic demand increases and decreases. However, networks of virtual wireless base stations may incur certain vulnerabilities.

Potential vulnerabilities include the following: first, an intruder may instantiate a rogue wireless base station into the network and begin to demand resources, leading to a denial of service attack; second, an intruder may take control of an existing trusted wireless base station and attempt to alter parameters within it with the intent of harming the network; and third, an intruder may instantiate a copy of an existing trusted wireless base station, including its public/private key, and use this to harm the network. A denial of service attack may be an expected form of attempted harm, in which a fake, compromised, or copied wireless base station may attempt to obtain resources, such as authorization for connections, thereby draining the resources of the other (proper) wireless base stations in the network.

Accordingly, what is needed is a system and method for preventing these and other potential forms of threats to a network of virtual wireless base stations.

SUMMARY OF THE DISCLOSURE

According to an aspect of the present disclosure, there is provided a system for protecting a network of virtual wireless base stations, comprising: a plurality of license servers, each of the license servers having a blockchain implementation; and a plurality of virtual wireless base stations, wherein each of the plurality of license servers is in communication with each of the plurality of virtual wireless basestations, and wherein the blockchain implementation of the license servers secures the network of virtual wireless base stations.

According to another aspect of the present disclosure, there is provided a method for initializing a secure wireless telecommunications network, comprising: instantiating a plurality of local license servers; exchanging a first PKI (Public Key Infrastructure) data between each of the plurality of local license servers and a master license server;

registering each of the plurality of local license servers by exchanging a second PKI data between each of the plurality of local license servers; instantiating a plurality of virtual wireless base stations; registering each of the virtual wireless base stations by exchanging a third PKI data between each of the plurality of virtual wireless base stations and storing an IP address corresponding to each of the virtual wireless base stations; obtaining a plurality of connection licenses at the master license server; allocating the plurality of connection licenses amongst the plurality of local license servers, wherein each of the local license servers has a blockchain implementation; transmitting information relating to the plurality of allocated connection licenses to each of the plurality of local license servers; distributing the plurality of allocated connection licenses to the plurality of virtual wireless base stations, wherein the distributing includes generating a plurality of transactions; and appending an indication of each of the plurality of transactions to each blockchain implementation.

According to another aspect of the present disclosure, there is provided a method for securely distributing excess capacity within a wireless communications network, comprising: identifying an excess of capacity within a first virtual wireless base station; broadcasting a first message to a plurality of license servers indicating the excess of capacity, wherein each of the license servers has a blockchain implementation; verifying that the first virtual wireless base station has proper possession of the excess capacity; transmitting information relating to the excess capacity from the first virtual wireless base station; broadcasting a second message to the license servers indicating a change of ownership of the excess capacity; and appending the blockchain implementation corresponding to each of the plurality of license servers with a first new block indicating the change of ownership of the excess capacity.

According to another aspect of the present disclosure, there is provided a method for securely responding to a localized lack of capacity within a wireless communications network, comprising: identifying a lack of capacity within a first virtual wireless base station; broadcasting a first message to a plurality of license servers indicating the lack of capacity, wherein each of the license servers has a blockchain implementation; confirming an identity of the first virtual wireless base station; determining that one of the plurality of license servers has a sufficient capacity to meet the lack of capacity; transmitting information relating to the sufficient capacity to the first virtual wireless base station; broadcasting a second message to the license servers indicating a change of ownership of the excess capacity; and appending the blockchain implementation corresponding to each of the plurality of license servers with a first new block indicating the change of ownership of the excess capacity.

According to another aspect of the present disclosure, there is provided a method for securely responding to a localized lack of capacity within a wireless communications network, comprising: identifying a lack of capacity within a first virtual wireless base station; broadcasting a first message to a plurality of license servers indicating the lack of capacity, wherein each of the license servers has a blockchain implementation; confirming an identity of the first virtual wireless base station; determining that none of the plurality of license servers has a sufficient capacity to meet the lack of capacity; broadcasting a second message to a plurality of virtual wireless base stations, wherein the plurality of virtual wireless base stations does not include the first virtual wireless base station; receiving a positive response from a second virtual wireless base station within the plurality of virtual wireless base stations indicating that the second virtual wireless base station has an excess capacity equal to or greater than the lack of capacity; transmitting information relating to a response capacity from the second virtual wireless base station to the first virtual wireless base station; broadcasting a third message to the license servers indicating a change of ownership of the response capacity; and appending the blockchain implementation corresponding to each of the plurality of license servers with a final new block indicating the change of ownership of the response capacity.

According to another aspect of the present disclosure, there is provided a method for identifying and replacing a compromised virtual wireless base station in a telecommunications network, the method comprising: receiving an audit report from a virtual wireless base station, the audit report including a number of owned connection licenses; determining from a blockchain implementation a number of transacted connection licenses corresponding to the virtual wireless base station; identifying a discrepancy between the number of owned connection licenses and the number of transacted connection licenses; identifying from the blockchain implementation an identification number corresponding to each of the number of transacted connection licenses; instantiating a replacement virtual wireless base station; shutting down the virtual wireless base station; and transmitting the transacted connection licenses to the replacement virtual wireless base station.

According to another aspect of the present disclosure, there is provided a non-transitory memory encoded with machine readable instructions, which when executed by one or more processors, cause the one or more processors to perform a process for initializing a secure wireless telecommunications network, the process comprising: instantiating a plurality of local license servers; exchanging a first PKI (Public Key Infrastructure) data between each of the plurality of local license servers and a master license server; registering each of the plurality of local license servers with a bus master, wherein the registering each of the plurality of local license servers includes exchanging a second PKI data between each of the plurality of local license servers and the bus master; instantiating a plurality of virtual wireless base stations; registering each of the virtual wireless base stations with the bus master, wherein the registering each of the plurality of virtual wireless base stations includes exchanging a third PKI data between each of the plurality of virtual wireless base stations and the bus master, and storing an IP address corresponding to each of the virtual wireless base stations; obtaining a plurality of connection licenses from a master license server; allocating the plurality of connection licenses to each of the plurality of local license servers, wherein each of the local license servers has a blockchain implementation; transmitting the plurality of allocated connection licenses to each of the plurality of local license servers; distributing the plurality of allocated connection licenses to the plurality of virtual wireless base stations, wherein the distributing includes generating a plurality of transactions; and appending an indication of each of the plurality of transactions to each blockchain implementation.

According to another aspect of the present disclosure, there is provided a non-transitory memory encoded with machine readable instructions, which when executed by one or more processors, cause the one or more processors to perform a process for securely distributing excess capacity within a wireless communications network, the process comprising: identifying an excess plurality of connection licenses within a first virtual wireless base station; broadcasting a first message to a plurality of local license servers indicating the excess plurality of connection licenses, wherein each of the local license servers has a blockchain implementation; verifying that the first virtual wireless base station has proper possession of each of the excess plurality of connection licenses; identifying a broker local license server within the plurality of local license servers; transmitting the excess plurality of connection licenses from the first virtual wireless base station to the broker local license server; broadcasting a second message to the local license servers indicating a change of ownership of the excess plurality of connection licenses; and appending the blockchain implementation corresponding to each of the plurality of local license servers with a first new block indicating the change of ownership of the excess plurality of connection licenses.

According to another aspect of the present disclosure, there is provided a non-transitory memory encoded with machine readable instructions, which when executed by one or more processors, cause the one or more processors to perform a process for securely responding to a localized lack of capacity within a wireless communications network, the process comprising: identifying a need for one or more connection licenses within a first virtual wireless base station; broadcasting a first message to a plurality of local license servers indicating the need for one or more connection licenses, wherein each of the local license servers has a blockchain implementation; confirming an identity of the first virtual wireless base station; determining that one of the plurality of local license servers is able to provide a responsive one or more connection licenses; transmitting the responsive one or more connection licenses to the first virtual wireless base station; broadcasting a second message to the local license servers indicating a change of ownership of the responsive one or more connection licenses; and appending the blockchain implementation corresponding to each of the plurality of local license servers with a first new block indicating the change of ownership of the responsive one or more connection licenses.

According to another aspect of the present disclosure, there is provided a non-transitory memory encoded with machine readable instructions, which when executed by one or more processors, cause the one or more processors to perform a process for securely responding to a localized lack of capacity within a wireless communications network, the process comprising: identifying a need for one or more connection licenses within a first virtual wireless base station; broadcasting a first message to a plurality of local license servers indicating the need for one or more connection licenses, wherein each of the local license servers has a blockchain implementation; confirming an identity of the first virtual wireless base station; determining that none of the plurality of local license servers is able to provide a responsive one or more connection licenses; broadcasting a second message to a plurality of virtual wireless base stations, wherein the plurality of virtual wireless base stations does not include the first virtual wireless base station; receiving a positive response from a second virtual wireless base station within the plurality of virtual wireless base stations indicating that the second virtual wireless base station is able to provide the responsive one or more connection licenses; transmitting the responsive one or more connection licenses from the second virtual wireless base station to the first virtual wireless base station; broadcasting a third message to the local license servers indicating a change of ownership of the responsive one or more connection licenses; and appending the blockchain implementation corresponding to each of the plurality of local license servers with a final new block indicating the change of ownership of the responsive one or more connection licenses.

According to another aspect of the present disclosure, there is provided a non-transitory memory encoded with machine readable instructions, which when executed by one or more processors, cause the one or more processors to perform a process for identifying and replacing a compromised virtual wireless base station in a telecommunications network, the process comprising: receiving an audit report from a virtual wireless base station, the audit report including a number of owned connection licenses; determining from a blockchain implementation a number of transacted connection licenses corresponding to the virtual wireless base station; identifying a discrepancy between the number of owned connection licenses and the number of transacted connection licenses; identifying from the blockchain implementation an identification number corresponding to each of the number of transacted connection licenses; instantiating a replacement virtual wireless base station; shutting down the virtual wireless base station; and transmitting the transacted connection licenses to the replacement virtual wireless base station.

DESCRIPTION OF EXEMPLARY EMBODIMENTS

Figure 1A:
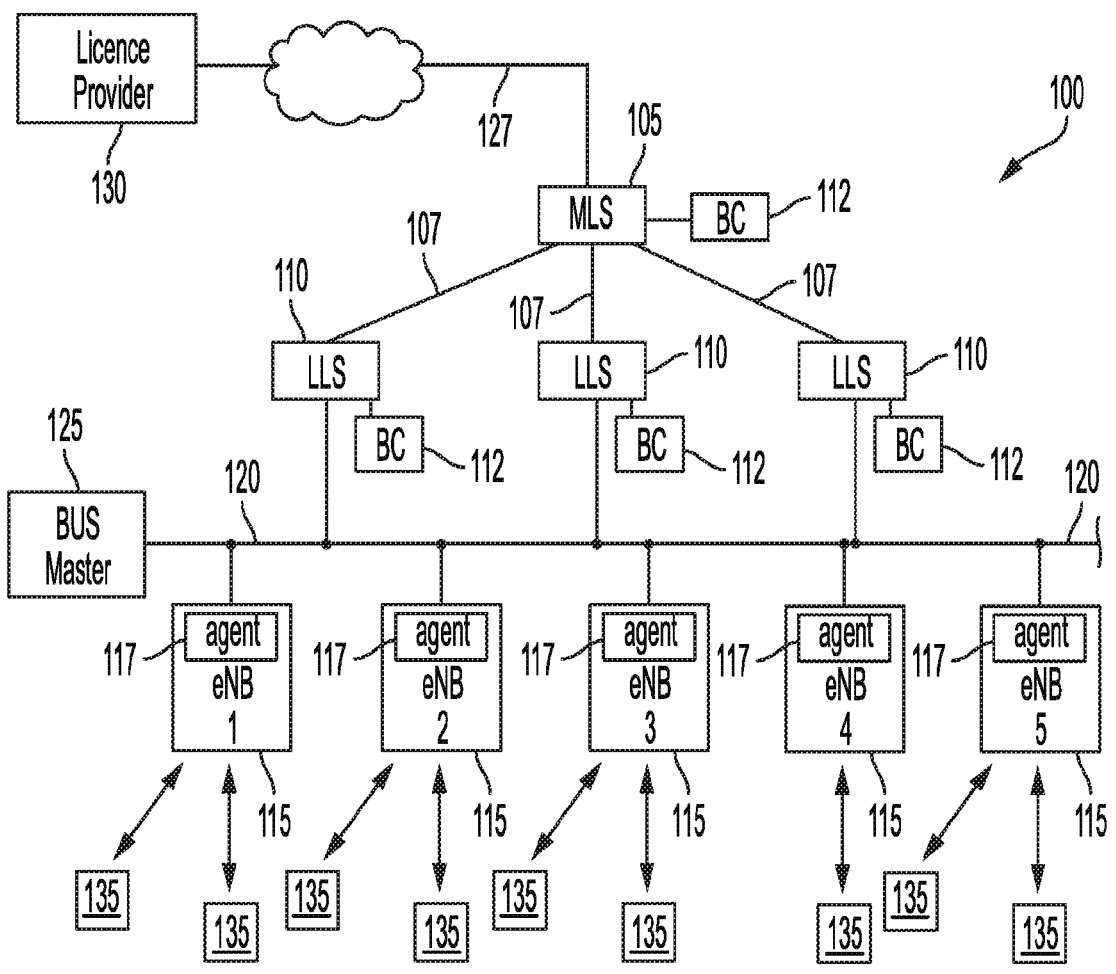
FIG. 1A illustrates an exemplary system for securing a wireless communication network according to the disclosure.

FIG. 1A illustrates an exemplary system 100 for securing a wireless communication network according to the disclosure. System 100 includes a plurality of virtual eNodeBs (Evolved Node Bs) 115, each of which are coupled to a bus 120 that has a bus master 125. Each virtual eNodeB 115 is a virtual base station which is software-implemented in a compute environment. Also coupled to bus 120 is a plurality of local license servers 110, each of which are also coupled to a master license server 105. Master license server 105 is further coupled to a license provider 130 over an internet connection 127. Each virtual eNodeB 115 may be connected to a subset of a plurality of UEs 135.

Each local license server 110 and the master license server 105 may have a blockchain implementation 112 for securing the network of virtual eNodeBs 115. Each blockchain implementation 112 of system 100 may be a component within a distributed ledger system employing known technologies, but implemented to secure the network of virtual eNodeBs 115. The master license server 105 may reside in the core network of a given network operator or in the network of an infrastructure provider. The local license servers 110 may be distributed throughout a region, such as a metropolitan area. Although three local license servers 110 are illustrated in system 100, it will be understood that different numbers of local license servers 110 are possible and within the scope of the disclosure, preferably in an odd numbered quantity. Bus 120 may be a VPN (Virtual Private Network) or similar internet-based communication network. Bus master 125 may be deployed in a standalone server or may be deployed within a server hosting one of the local license servers 110.

The local license servers 110 may be clustered in groups (not shown), which may correspond to a geographical area. Additionally, a given group of local license servers 110 may be defined such that given the hourly, weekly, and event-driven fluctuations in demand, the aggregate demand within a single group of local license servers 110 may remain substantially constant. In other words, a given group may encompass residential areas, office complexes, and one or more large venues (e.g., stadium, airport, campus, etc.).

As noted above, each virtual eNodeB 115 is a virtual base station which is software-implemented in a compute environment. The compute environment has hardware components including one or more processors and a non-transitory computer readable memory, and when configured with appropriate software the hardware components operate to implement the virtual eNodeB 115. In some implementations, the software is stored in the non-transitory computer readable memory of the compute environment. In other implementations, the software is stored elsewhere, but executed in the compute environment, for example through an API (Application Programing Interface) provided by the compute environment. Each virtual eNodeB 115 has an eNodeB agent 117, which may be a software module running on compute hardware dedicated to its corresponding virtual eNodeB 115. As used herein, when a virtual eNodeB 115 is described as performing a function within system 100, it will be understood that it may do so via its corresponding agent 117. Further, each agent module 117 may be a standalone software entity from its corresponding virtual eNodeB 115, or it may be integrated into the software of the virtual eNodeB 115.

While the system 100 and the present disclosure as a whole may focus on systems having a network of virtual eNodeBs, it is to be understood that other virtual wireless base stations are possible and are within the scope of the disclosure. Embodiments of the disclosure are generally applicable to any suitable virtual wireless base station, such as a virtual LTE (Long-Term Evolution) eNodeB, a virtual 5G NR (New Radio) gNodeB, or a CU (Central Unit) or DU (Distributed Unit) of a virtual 5G gNodeB, for example. It will be understood that such variations are possible and within the scope of the disclosure.

For the purposes of this disclosure, a "virtual wireless base station" is a software-implemented base station in a compute environment. Although the compute environment can include some specialized hardware components, examples of which are described later, a virtual wireless base station remains at least partially software-based. As a result, a virtual wireless base station is generally capable of being remotely upgradeable or configurable. This is because it is possible to remotely upgrade or configure software. This is in contrast to a hardware-based base station, which is generally not capable of being remotely upgradeable or configurable. Instead, upgrading or configuring a hardware-based base station normally involves deployment of a person to physically modify or replace the hardware-based base station on site.

Figure 1B:
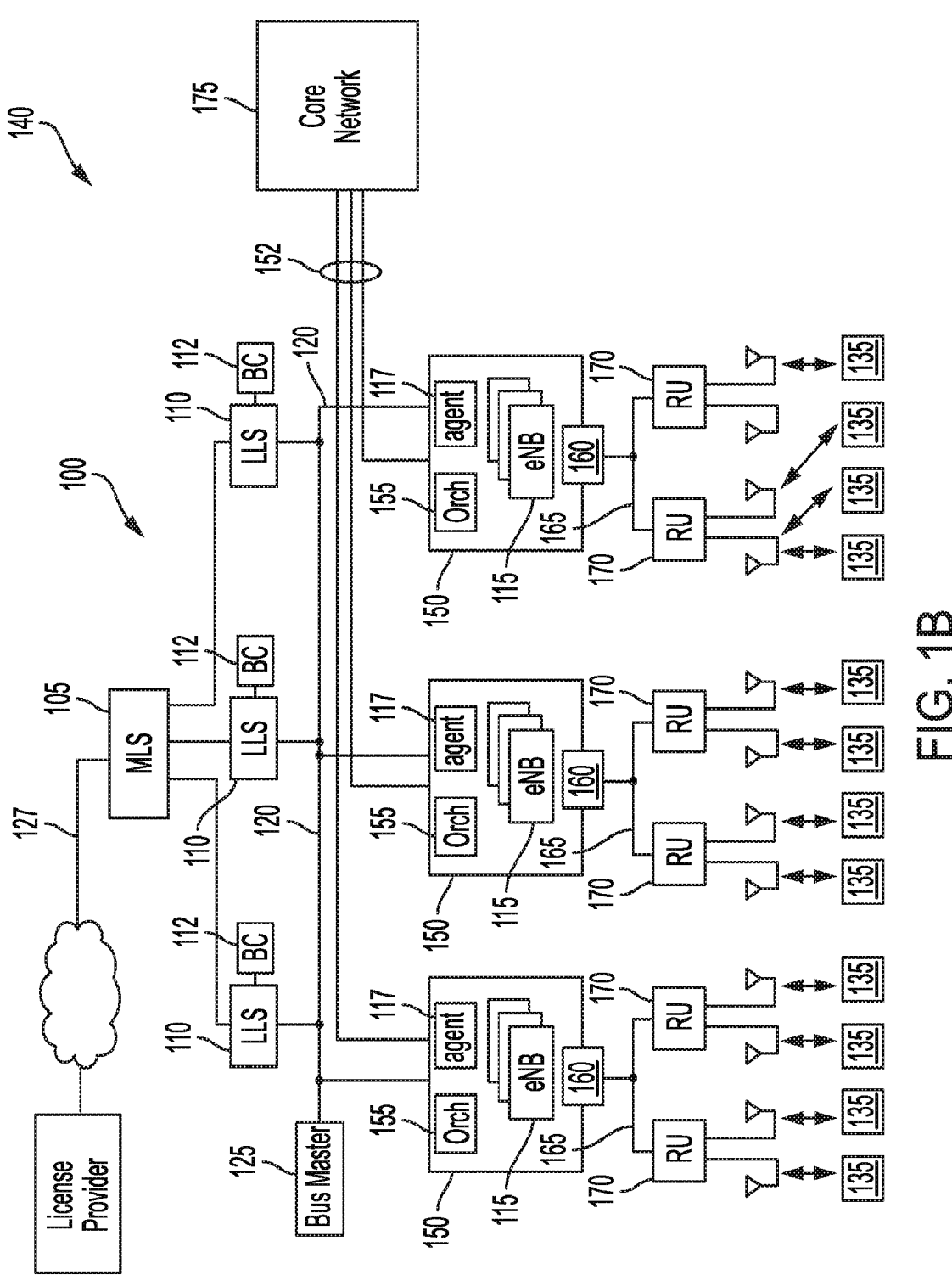
FIG. 1B illustrates the system of FIG. 1A deployed in an exemplary telecommunication network.

FIG. 1B illustrates an exemplary telecommunications network 140 in which system 100 is deployed. In addition to the components of system 100, network 140 includes a plurality of local compute environments 150, each hosting a plurality of virtual eNodeBs 115. The other virtual eNodeBs hosted by compute environment 150 may correspond to other network operators or private networks. Also hosted on compute environment 150 is an orchestrator module 155; and a fronthaul interface 160, in addition to agent 117. Each compute environment 150 may be coupled to one or more remote units 170 over a fronthaul connection 165. Fronthaul interface 160 and fronthaul connection 165 may employ a CPRI (Common Public Radio Interface) or a packet-based protocol. Further, each virtual eNodeB 115 of a given network operator may be coupled to the network operator's core network 175 via backhaul interface connection 152.

Orchestrator module 155 may perform the following functions: instantiate, de-instantiate and configure virtual eNodeBs 115; coordinate communication between each virtual eNodeB 115 and the remote units 170 by configuring fronthaul interface 160; and configure the remote units 170 for proper operation with each of the virtual eNodeBs 115.

The disclosed exemplary system 100 distributes connection licenses from a license provider 130 to each of the virtual eNodeBs 115, wherein each connection license may correspond to a single active connection between a given virtual eNodeB 115 and a connected UE 135. The license may take the form of a "connection token" as described in co-owned U.S. patent application Ser. No. 15/918,799, SYSTEM AND METHOD FOR ADAPTIVELY TRACKING AND ALLOCATING CAPACITY IN A BROADLY-DISPERSED WIRELESS NETWORK, which is incorporated by reference as though fully disclosed herein.

The following is a brief explanation on the use of connection licenses. A given network operator pays an infrastructure provider for a subscription to a predetermined set of connection licenses. The license provider 130 transmits the connection licenses to master license server 105 over internet connection 127. The local license servers 110 and virtual eNodeBs 115 may be dispersed over a broad geographical area, such as a metropolitan region, in which different areas (and thus different virtual eNodeBs 115) experience alternating fluctuations in demand, depending on the day of the week, time of day, special events, etc. Under a connection license scheme, a network operator may buy a set number of connection licenses and distribute them to the different virtual eNodeBs 115, via one or more local license servers 110, according to the demand experienced by each virtual eNodeB 115. This way, the network operator only pays for the active connections it uses and may shift its network capacity around to accommodate fluctuations in demand. Accordingly, the use of connection licenses is an example of how to represent network capacity, quantized as UE connections, either active connections (assigned connection licenses) or available connections (unassigned connection licenses).

Each connection license may include a license ID number and potentially additional parameters. Each connection may correspond to a single active UE connection, or to an aggregate (e.g., 10 or 100) active UE connections. A connection license may have additional parameters in addition to the representation of an active connection. For example, a given license may include a parameter indicating a licensed high/low data rate. In this case, a high data rate license may apply to an active connection to a high speed camera or automotive control system, whereas a low data rate license may apply to an active connection to an IoT (Internet of Things) device, such as a water meter or temperature sensor. Further, there may be different types of licenses, such as the aforementioned connection licenses, and feature licenses, which may apply to a given virtual eNodeB 115. A feature license may include a license to a specific Carrier Aggregation capability, CBRS (Citizens Broadband Radio Service) channel capability, EIRP (Effective Isotropic Radiated Power), higher order MIMO (Multiple-Input and Multiple-Output) capability, etc. The connection licenses and feature licenses may both be deployed in system 100 and managed under a single blockchain 112. Alternatively, each local license server 110 may maintain two blockchains 112, one for connection licenses and the other for feature licenses (not shown). It will be understood that such variations are possible and within the scope of the disclosure.

Each of the components within system 100 may comprise machine readable instructions that are encoded within one or more non-transitory memory devices and executed on one or more processors that perform their respective described functions. As used herein, "non-transitory memory" may refer to any tangible storage medium (as opposed to an electromagnetic or optical signal) and refer to the medium itself, and not to a limitation on data storage (e.g., RAM (Random Access Memory) vs. ROM (Read Only Memory)). For example, non-transitory medium may refer to an embedded volatile memory encoded with instructions whereby the memory may have to be re-loaded with the appropriate machine-readable instructions after being power cycled. Further, each of the components within system 100 may be deployed within its compute environment 150 using container technology.

In some implementations, each compute environment 150 includes a server, which may comprise one or more rack servers or blade servers, each of which may have multiple processor cores. Alternatively, instead of rack or blade servers, the compute environment 150 can include a server having a custom form factor and proprietary design. Regardless, the server of the compute environment 150 has one or more processor cores, which are coupled to one or more storage devices. The server is coupled to the Internet via an internet connection and a server network interface. The server may also have a fronthaul network interface card. If the fronthaul is implemented under the CPRI specification, then the fronthaul network interface card may be a PCIe (Peripheral Component Interconnect) board having circuitry that converts digital signal data to/from a CPRI format for transport over a fronthaul link. The server may further have hardware accelerator components, such as FPGAs (Field Programmable Gate Arrays) that are deployed on standard computer interface cards and programmed using well known IP (Intellectual Property) blocks to execute specific high speed computation for signal processing, as may be required.

Each of the steps of the processes below are described in exemplary terms as being performed by one or more components within system 100. In doing so, it will be understood that where it states that a certain module (e.g., master license server 105, local license server 110, virtual eNodeB 115, etc.) performs a certain task, it means that one or more processors within the respective compute environment of that module executes machine readable instructions for the given module to implement the process described.

Figure 2:
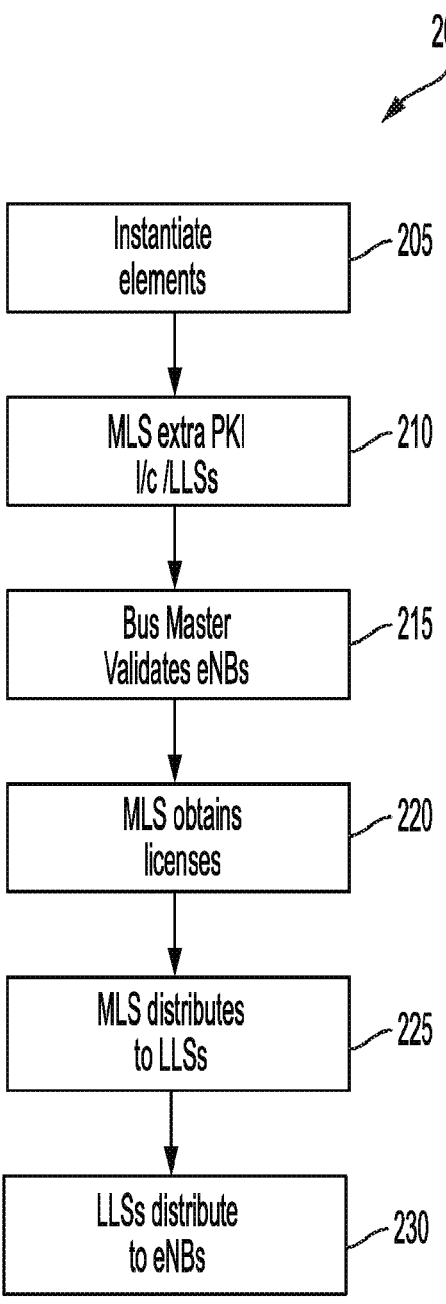
FIG. 2 illustrates an exemplary process for initiating the system of FIG. 1A.

FIG. 2 illustrates an exemplary process 200 for initializing system 100 according to the disclosure.

In step 205, the processors of their respective compute environments instantiate master license server 105, the local license servers 110 and their respective blockchains 112 (or initial elements thereof), and the virtual eNodeBs 115 including their agents 117. Each of these modules then establish communications over their respective connections.

In step 210, the master license server 105 establishes secure communications with each local license server 110 via an exchange of PKI (Public Key Infrastructure) information. In doing so, the local license servers 110 and the master license server 105 each generate their own public/private key pairs and exchange the public keys with each other, thereby establishing secure communications among the trusted components (master license server 105 and local license servers 110).

In step 215, each virtual eNodeB 115 registers itself with bus master 125. In doing so, the bus master 125 and each of the virtual eNodeB 115 may exchange PKI information to establish secure communications as among trusted devices. Further to step 215, the bus master 125 and each virtual eNodeB 115 may exchange PKI information to establish secure communications between the virtual eNodeBs 115 and the local license servers 110 as well as between each virtual eNodeB 115 and the other virtual eNodeBs 115 over the bus 120. The result of this is that each of the virtual eNodeBs 115 has a trust relationship with each of the local license servers 110 and with the other virtual eNodeBs 115. Further to step 215, the bus master 125 may store the IP addresses of each of the trusted virtual eNodeBs 115 and local license servers 110 to provide additional security for situations described below.

In step 220, the master license server 105 obtains an initial block of connection licenses from license provider 130. In a variation, this may be a subset of the total intended set of connection licenses. Master license server 105 then allocates the obtained connection licenses to each local license server 110. This may include creating a master table of connection licenses that maps each connection license to a destination local license server 110. This master table may form the foundation or genesis block of the blockchain 112 within master license server 105. In the case in which virtual eNodeB 115 features are also licensed, master license server 105 may create a second table for the feature licenses, along with the destination local license servers for those feature licenses, forming the foundation or genesis block of a second blockchain 112 for eNodeB features. Otherwise, if feature licenses are being used, they may be included in the master table along with the connection licenses.

In step 225, the master license server 105 distributes the licenses to the local license servers 110. In doing so, master license server 105 may transmit a copy of the master table generated in step 220 to each of the local license servers 110. The master table received by each of the local licensed servers 110 identifies which local license server 110 is allocated which connection licenses. Further, the master table received by each local license server 110 may serve as the genesis block of its own blockchain 112. Each local license server 110 may then allocate its designated connection licenses to each of its designated virtual eNodeBs 115 mapping its allocated connection licenses to its designated virtual eNodeBs 115. The result is that each local license server 110 has an identical copy of the master table provided by the master license server, with its individual allocated connection licenses mapped to its designated virtual eNodeBs 115.

In step 230, at least one of the local licensing servers 110 distributes its connection licenses to the virtual eNodeBs 115, according to a corresponding set of one or more of the agent modules 117 of the allocation it performed in step 225. On receipt of its connection licenses, each virtual eNodeB 115 may store the allocated licenses in memory within its respective agent module 117. In the case of a separate set of feature licenses, each virtual eNodeB 115 agent module 117 may store that information as well, which its corresponding virtual eNodeB 115 may use to configure itself for operating with the licensed features. On acceptance of its respective connection licenses, each virtual eNodeB 115 may generate and digitally sign a message about the successful transaction that it may then broadcast to the local license servers 110. In response, each local license server 110 and the master license server 105 may append their own blockchains 112 with information regarding the successful transfer of ownership of each connection license, including the previous and new owners of the connection license. Accordingly, at the end of step 230, each virtual eNodeB 115 has its intended connection licenses and may thus begin connecting to UEs 135; and each of the local license servers 110 has an identical blockchain indicating the current state of ownership of each of the connection licenses obtained by the master license server 105 in step 220. Each virtual eNodeB 115 may assign a given connection license to a given UE 135 when that UE 135 connects to the virtual eNodeB 115. As this continues, agent 117 may designate assigned connection licenses as in use (assigned), and the remainder of its connection licenses as inactive or unassigned.

In an example, each local license server 110 distributes its connection licenses to a given cell within virtual eNodeB 115, identified by the cell's ECGI (global cell ID). Alternatively, each receiving virtual eNodeB 115 may assign each connection license to a given cell.

Variations to the blockchains 112 are possible. For example, each block in the block chain 112 may contain a single connection license transaction. Alternatively, each block may contain all of the connection licenses within a given transaction involving a set of connection licenses. As an example of the latter case, if in step 230 a given local license server 110 provides a set of multiple connection licenses to a given virtual eNodeB 115, the receiving virtual eNodeB 115 may transmit information about the change in ownership as a single transaction of the multiple connection licenses. In this case, each block in the blockchain 112 may be of different sizes, depending on the number of connection licenses in a given transaction. The same may be true of feature licenses, whereby a given virtual eNodeB may receive—and thus transmit information about—a set of multiple connection licenses as well as a set of eNodeB feature licenses (Carrier Aggregation, EIRP, CBRS channels, etc.) as a single transaction. It will be understood that such variations are possible and within the scope of the disclosure.

Figure 3A:
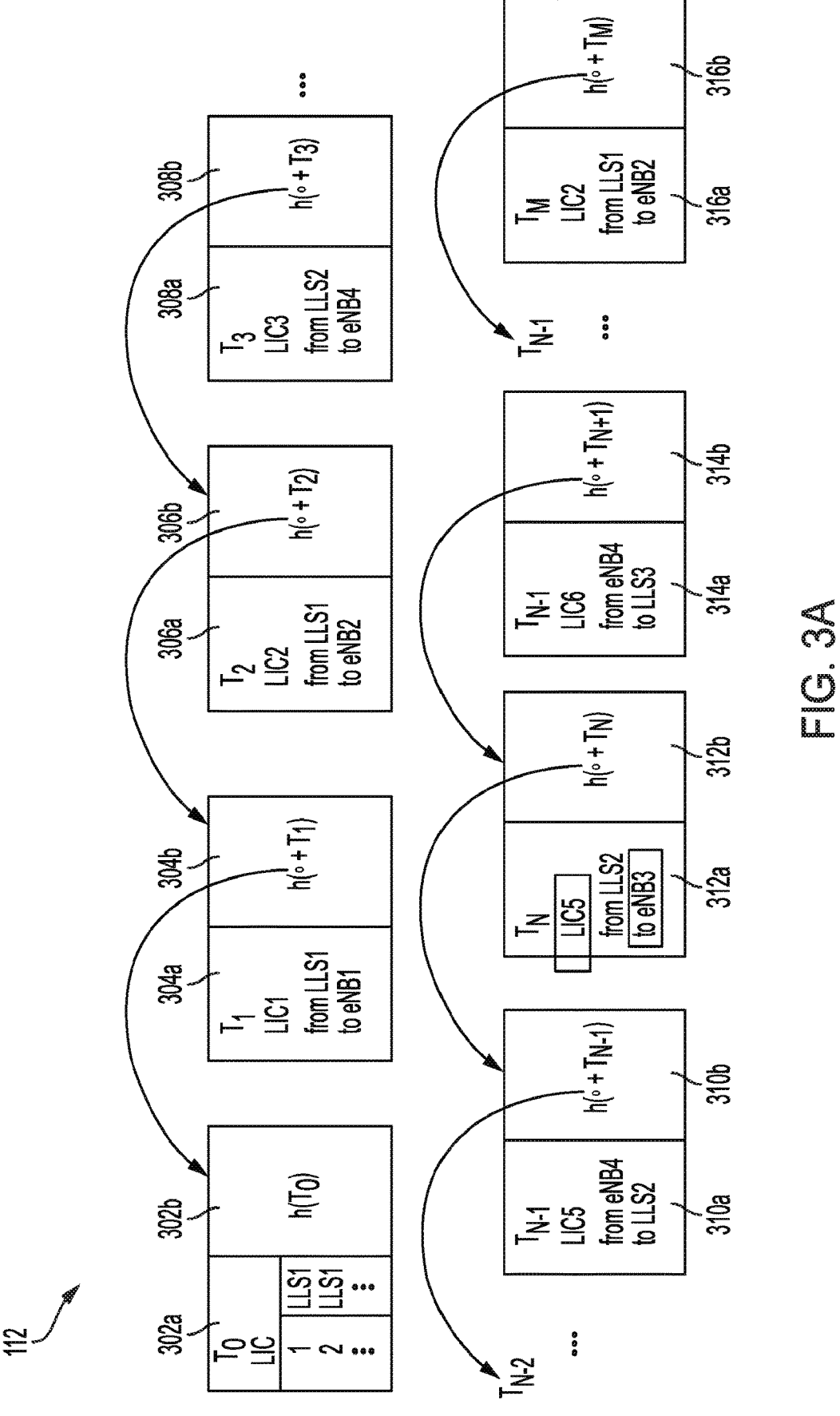
FIG. 3A illustrates an exemplary blockchain according to the disclosure, in which each transacted connection license gets its own block.

FIG. 3A illustrates an exemplary blockchain 112 according to the disclosure. Blockchain 112 has a master table 302a, which is provided to the local license server 110 by master license server 105 in step 225 above. Master table 302(a) serves as the genesis block of blockchain 112. The processor(s) hosting local license server 110 executes instructions to do the following: to store master table 302a, designating it as transaction zero ($T_0$); and to compute the hash of master table 302*a* and store it as master table hash 302*b*. As each virtual eNodeB 115 receives connection licenses from local license servers 110, it transmits information about the transaction to all of the local license servers 110 over bus 120, each of which logs the transaction in its respective blockchain 112. As illustrated, a transaction $T_1$ corresponds to the transfer of ownership of a single connection license "1" from local license server "1" to virtual eNodeB "1". Each local license server 110 executes instructions to store transaction $T_1$ as block 404*a*, and then computes a hash of the combination of the master table hash 402*b* and block 404*a*, thereby generating $T_1$ hash 404*b*. This continues for each individual connection license transaction, as illustrated.

Figure 3B:
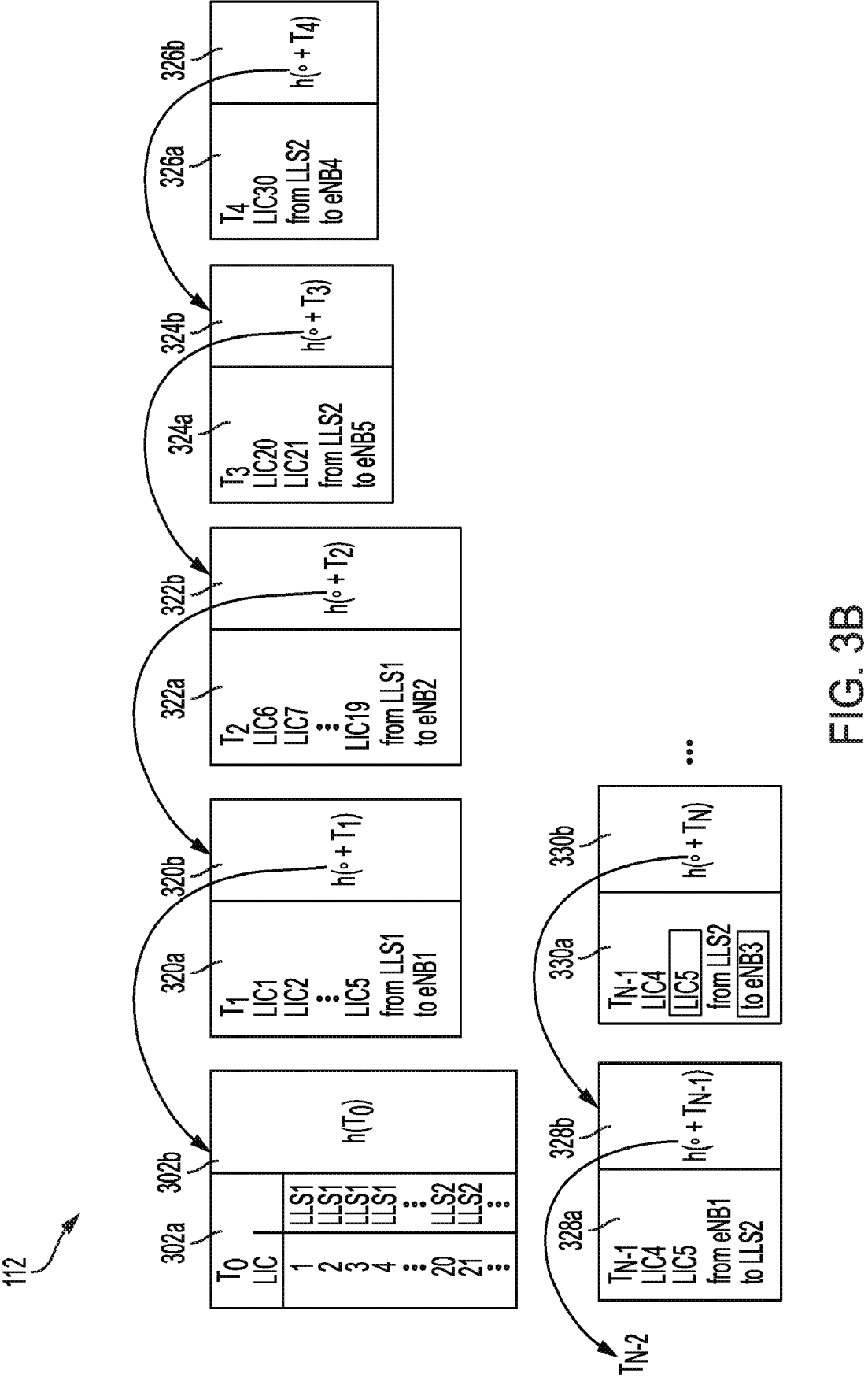
FIG. 3B illustrates an exemplary blockchain according to the disclosure, in which a given block contains multiple connection licenses subject to a single transaction.

FIG. 3B illustrates another exemplary blockchain 112 according to the disclosure. Blockchain 112 of FIG. 3B logs connection license transactions in blocks having multiple connection licenses in a single transaction. Accordingly, master table 302*a* and master table hash 302*b* may be the same as in the example of FIG. 3A. However, in this example, the distribution of connection licenses performed in step 230 above results in each virtual eNodeB 115 transmitting to all of the local license servers 110 information about it having gained ownership of a set of connection licenses, identifying the connection licenses by number. In this case, each local license server 110 executes instructions to create a single block for the given transaction in which virtual eNodeB's 115 takes ownership of the connection licenses in the transaction. In the example illustrated in FIG. 3B, all of the connection licenses transmitted from local license server 110 to virtual eNodeB "1" in step 230 are logged as a single transaction $T_1$ in a single block 320*a*. Local license server 110 then computes a hash of the combination of block 320*a* and master hash 302*b* to generate hash 320*b*. Similarly, all of the connection licenses obtained by virtual eNodeB "2" in step 230 are logged as transaction $T_2$ and given a block 322*a*, and local license server 110 computes a hash of the combination of block 322*a* and hash 320*b* to generate hash 322*b*. This process continues with each connection license acquisition by each virtual eNodeB 115. Once all of the connection licenses have been distributed in step 230, blockchain 112 of FIG. 3B then logs transactions in which a given virtual eNodeB obtains any number of connection licenses in a single transaction. This will be discussed further below.

Figure 3C:
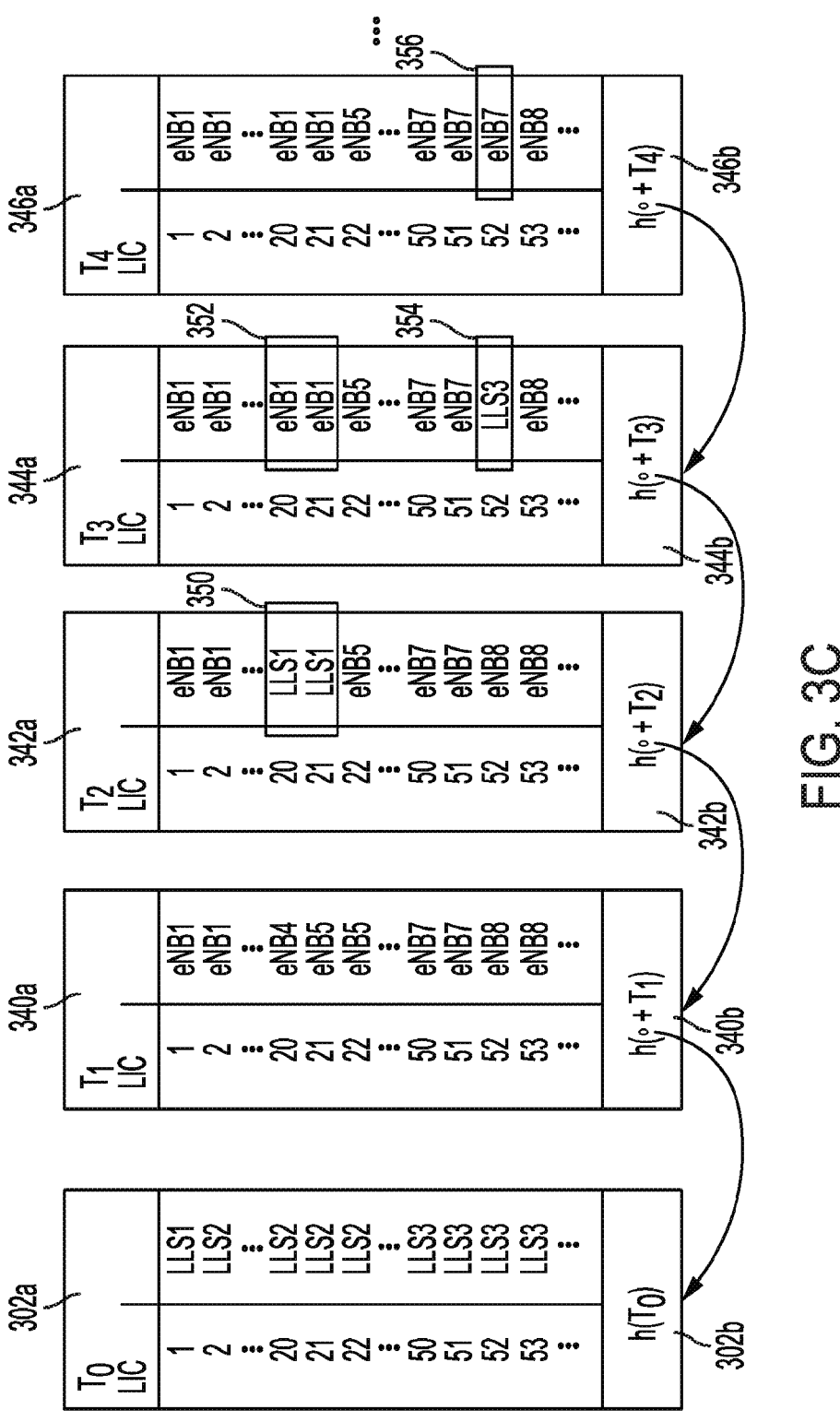
FIG. 3C illustrates an exemplary blockchain according to the disclosure, in which each block contains a modified copy of a master table, modified to show change in connection license ownership from a transaction.

FIG. 3C illustrates an exemplary blockchain 112, in which the entire master table is copied in each block, and a given transaction is identified as a change in the appropriate entry/entries in the table, reflecting the change in ownership of one or more connection licenses.

Referring to the example of FIG. 3C, two different transactions showing change in ownership as shown. In transaction $T_2$, as illustrated in block 342*a*, connection licenses "20" and "21" were respectively transferred from virtual eNodeB "4" and virtual eNodeB "5" to local license server "1" (entry 350). Accordingly, block 342*a* lists local license server "1" as the owner of these connection licenses. Then in transaction $T_3$, local license server "1" transferred these two connection licenses to virtual eNodeB "1" (entry 352). As illustrated, each eNodeB-eNodeB connection license transfers takes place through a local license server 110. An advantage to this approach is that, if during a connection license transaction, the destination virtual eNodeB 115 goes down, the connection licenses subject to the transaction are securely stored in a local license server 110. A second similar transaction is illustrated in FIG. 3C, in which connection license "52" is transferred from virtual eNodeB "8" (block 342*a*) to local license server "3" (block 344*a*, entry 354) to virtual eNodeB "7" (block 346*a*, entry 356). The same approach may be taken with the example blockchains 112 of FIGS. 3A and 3B, in which a given local license server 110 acts as an intermediary in an eNodeB-eNodeB transaction.

Figure 4:
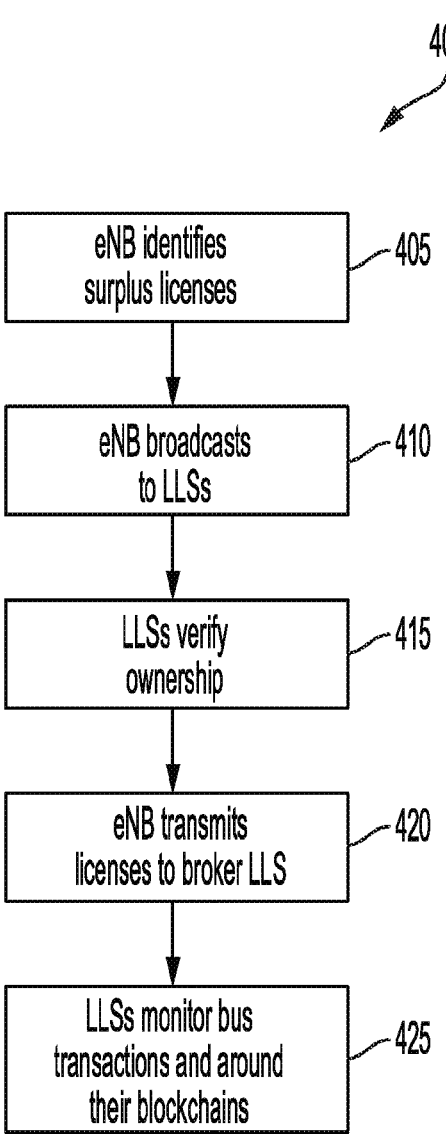
FIG. 4 illustrates an exemplary process whereby a virtual eNodeB may have a surplus of connection license redistributed to respond to changes in demand for connectivity.

FIG. 4 illustrates an exemplary process 400 for securely redistributing an excess of unassigned connection licenses according to the disclosure. This situation might occur if a given virtual eNodeB 115, which had previously experienced an abundance of UE 135 connection traffic, had many or most of those UE's subsequently disconnect. Examples of this situation might include an office building after evening rush hour, or stadium after a game.

In step 405, a given virtual eNodeB 115 identifies an excess of unassigned connection licenses. As mentioned above, a given virtual eNodeB's agent 117 may maintain its allocated connection licenses in one of two states: assigned (to a UE 135), or unassigned. Accordingly, agent 117 has ready access to information regarding whether it has a surplus of unassigned connection licenses. For example, agent 117 may be configured with a percentage threshold to determine whether it has an excess of unassigned connection licenses (e.g., 60% unassigned may automatically imply an excess). Further to this, agent 117 may store historical information regarding UE connection traffic experienced by virtual eNodeB 115 as a function of day and time and may use this information to determine whether the virtual eNodeB 115 has excess connection licenses that it will not likely need within a reasonable time horizon. For example, agent 117 may have 50% unassigned, but historical data indicates that at this day and time, a surge in demand is expected. An exemplary time horizon might be a 6, 12, or 24-hour period in which it does not foresee an increase in demand for connections beyond the connection licenses it already has. Agent 117 may also perform a look-ahead function using one or more known algorithms for doing so. Further details and variations for this are described with regard to the "ACCS Client" described in aforementioned co-owned U.S. patent application Ser. No. 15/918,799, which is incorporated by reference as if fully disclosed herein. The result of step 405 is that agent 117 of virtual eNodeB 115 determines that is has an excess of unassigned connection licenses and determines that it may return those excess connection licenses (also referred to as excess capacity) to the network.

Additionally, the virtual eNodeB 115 may employ mechanisms specified in 3GPP (3rd Generation Partnership Project) for determining demand, including setting a configurable threshold to send an alarm to agent module 117 if the demand has dropped below it (e.g., 5% of configured maximum capacity, or a set number of connected UEs). This mechanism may use the standard PM-Stat files (Performance Measurement) that may be generated periodically and transmitted to the core network via a northbound interface (not shown) that is also specified by 3GPP. The PM-Stat file may be generated at different temporal granularities, e.g., every 5 minutes, 15 minutes, 30 minutes, or one hour, as specified in 3GPP TS 32.401. Additionally, agent 117 may use the information generated in PM-Stat file for its historical usage data for performing look ahead functions and anticipating likely drops and surges in demand. It will be understood that such variations are possible and within the scope of the disclosure.

In step 410, virtual eNodeB 115, though its agent 117, broadcasts over bus 120 to the local license servers 110 that it has excess capacity, i.e., an excess of connection licenses and/or unneeded feature licenses. This information may include the number of connection licenses, specific connection license numbers, and any features or capabilities corresponding to the licenses.

In step 415, each local license server 110 executes instructions to verify that the broadcasting virtual eNodeB 115 is the owner of the licenses being offered. In doing so, each local license server 110 checks the digital signature of broadcasting virtual eNodeB 115. Having verified the signature of the broadcasting virtual eNodeB 115, each local license server 110 scans its blockchain 112 to identify the current owner of each of the connection licenses offered by the broadcasting virtual eNodeB 115. This may be done on a connection license by connection license basis, by identifying the last transaction in its blockchain 112 in which each given connection license changed ownership. If the most recent transaction shows the broadcasting virtual eNodeB 115 to be the most recent recipient of a given connection license, ownership is confirmed.

However, if scanning the transaction record of blockchain 12 reveals that the last transaction for the given connection license indicates that a different virtual eNodeB 115 owns the connection license, then local license server 110 may terminate the transaction and gather information about the broadcasting virtual eNodeB 115 (including information like IP address, etc.) and issue an alert to master license server 105. This may trigger an audit process, which is described further below.

Each of the local license servers 110 may execute step 415 in parallel. In a variation, the first local license server 110 to verify (or refute) ownership may broadcast this result to the other local license servers 110, thereby potentially reducing the computational overhead of system 100 consumed in the verification process of step 415.

Verification step 415 may be done in different ways. For example, the offering virtual eNodeB 115 may list the numbers of the connection licenses it is offering, and the local license servers may verify ownership as described above. Alternatively, the offering virtual eNodeB 115 may broadcast the quantity of connection licenses it is willing to give up. In this case, the local license servers 110 may parse through their respective blockchains 112 to determine how many connection licenses the offering virtual eNodeB 115 owns, and if the number of connection licenses being offered appears reasonable. In this case, 'reasonable' may mean that the number of connection licenses being offered is a certain percentage (e.g., less than 50%) of the connection licenses owned, and no more. This applies in the case in which the offering virtual eNodeB 115 is intended to continue operation. If the offering virtual eNodeB 115 is about to be shut down, the 50% reasonableness threshold may not apply, because the offering virtual eNodeB 115 would then be offering all of its connection licenses. It will be understood that such variations are possible and within the scope of the disclosure.

The next phase in the verification process is to determine that the transaction record has not been corrupted or hacked to show a fictitious ownership. This might occur whereby a malicious entity may have taken over the broadcasting virtual eNodeB 115 and seeks to disrupt the network by causing a double-spend of a set of connection licenses, whereby more than one copy of one or more connection licenses are introduced into system 100.

One way to do this is verification for each local license server 110 to step one transaction back in its respective blockchain 112 from the transaction in which the broadcasting virtual eNodeB 115 took ownership of the connection license and obtain the hash value of the previous transaction, and then compute a new hash of the combination of the identified transaction and the previous transaction hash, and compare this to the hash value corresponding to the identified transaction.

Referring to the example blockchain 112 of FIGS. 3A and 3B, in an example in which connection license "5" is one being offered up by broadcasting virtual eNodeB "3", the local license server 110 would identify block 312a/330a, corresponding to transaction $T_N$ in which virtual eNodeB "3" took ownership of connection license "5". To confirm that the block for transaction $T_N$ has not been hacked, local license server 110 may obtain the value for hash 310b/328b of previous transaction $T_{N-1}$, combining it with the data of transaction $T_N$ 312a/330a, computing a new hash 312b/330b, and comparing new hash 312b/330b with pre-existing hash 312b/330b. If the new and preexisting hash values match, then the transaction was not altered. If the new and preexisting hash values do not match, then transaction $T_N$ block 312a/330a was altered. In this case, local license server 110 may terminate the transaction and issue an alert to master license server 105.

This verification step would be substantially similar for blockchain 112 of FIG. 3C, in which local license server 110 verifies that virtual eNodeB "3" has possession of connection license "5". In this case, given that each block is a full table of connection license ownership, the local license server 110 can check the last block in the blockchain 112. To check whether this ownership is invalid (the result of alteration of the record), local license server may go back through blockchain 112 to identify the first block in which virtual eNodeB "3" took possession of connection license "5" (not shown in FIG. 3C). Then, as with the examples for the blockchains of FIGS. 3A and 3B, local license server may obtain the hash of the previous transaction to the one in which virtual eNodeB "3" took possession of connection license "5", combine it with the block in which virtual eNodeB "3" took possession of connection license "5", compute the hash of the combination, and compare this hash with the pre-existing hash. If they don't match, then the block in which virtual eNodeB "3" took possession of connection license "5" had been altered.

Another possible alteration is that a malicious player may have altered or removed a transaction in which the broadcasting virtual eNodeB 115 subsequently transferred the given license to another virtual eNodeB 115, and now wants to represent that it still owns it. In this case, each local license server 110 may recompute the hashes from verified transaction 330a through to the end of block chain 112 and compare each to its corresponding pre-existing hash. If any subsequent transaction was altered or removed, the corresponding computed hash would not match its pre-existing counterpart hash. In this case the local license server 110 may terminate the transaction and issue an alert to the master license server 105. This type of blockchain scan and verify may be done periodically as part of a regular audit process described further below.

With ownership of the offered connection licenses verified, process 400 may proceed to step 420, in which one of the local license servers 110 designates itself as broker to the transaction for the offered connection licenses. In doing so, the broker local license server 110 may signal to the broadcasting virtual eNodeB 115 that it shall take ownership of the offered connection licenses.

Further to step 420, the broadcasting virtual eNodeB 115 transmits the offered connection licenses to the broker local license server 110 over bus 120.

In step 425, each of the local license servers 110, including broker local license server 110, and master license server 105 append their respective blockchains 112 with an indication of the transaction to indicate the broker local license server 110 as the new owner of the offered connection licenses. Depending on the implementation of blockchain 112 described above (with reference to FIGS. 3A-C), each local license server 110 may do so by appending their respective blockchains 112 with a plurality of blocks and corresponding hashes, one per connection license; a single block and corresponding hash, representing all the connection licenses in the transaction; or a single block with an updated copy of the master table, along with its corresponding hash, wherein the master table has been edited to show the broker local license server 110 as the new owner of the offered connection licenses.

Process 400 may be initiated and executed by a virtual eNodeB 115 that is in the process of being shut down or deactivated. Given that system 100 can accommodate software-based virtual eNodeBs 115, there may be situations in which a mobile network may shut down one or more virtual eNodeBs 115 in response to a drop in demand. As mentioned before, an example may be an office complex after evening rush hour, or a stadium after a game. The ability of system 100 to dynamically redistribute connection licenses is one advantage of the present disclosure; another is the ability to enable the dynamic instantiating and de-instantiating of virtual eNodeBs 115. If the given virtual eNodeB 115 is to be shut down, its orchestrator 155 may issue instructions to the remote units 170 to start powering down the one or more cells corresponding to this virtual eNodeB 115. As the signal power of the virtual eNodeB 115 drops, the connected UEs 135 may identify alternate cells of other virtual eNodeBs 115 of system 100. Each UE 135 may do so according to 3GPP-specified procedures. To facilitate this, orchestrator 155 may issue instructions for one or more other neighboring cells of other virtual eNodeBs 115 to ramp up its power, which may more assuredly trigger each UE 135 to jump off an onto the other virtual eNodeB 115 and provide coverage for these UEs 135.

At the end of process 400, the broker local license server 110 now has possession of the excess connection licenses offered by broadcasting virtual eNodeB 115. Broker local license server 110 may subsequently redistribute some or all of the newly-acquired connection licenses to other virtual eNodeBs 115 in response to changes in demand for connectivity within system 100.

Figure 5:
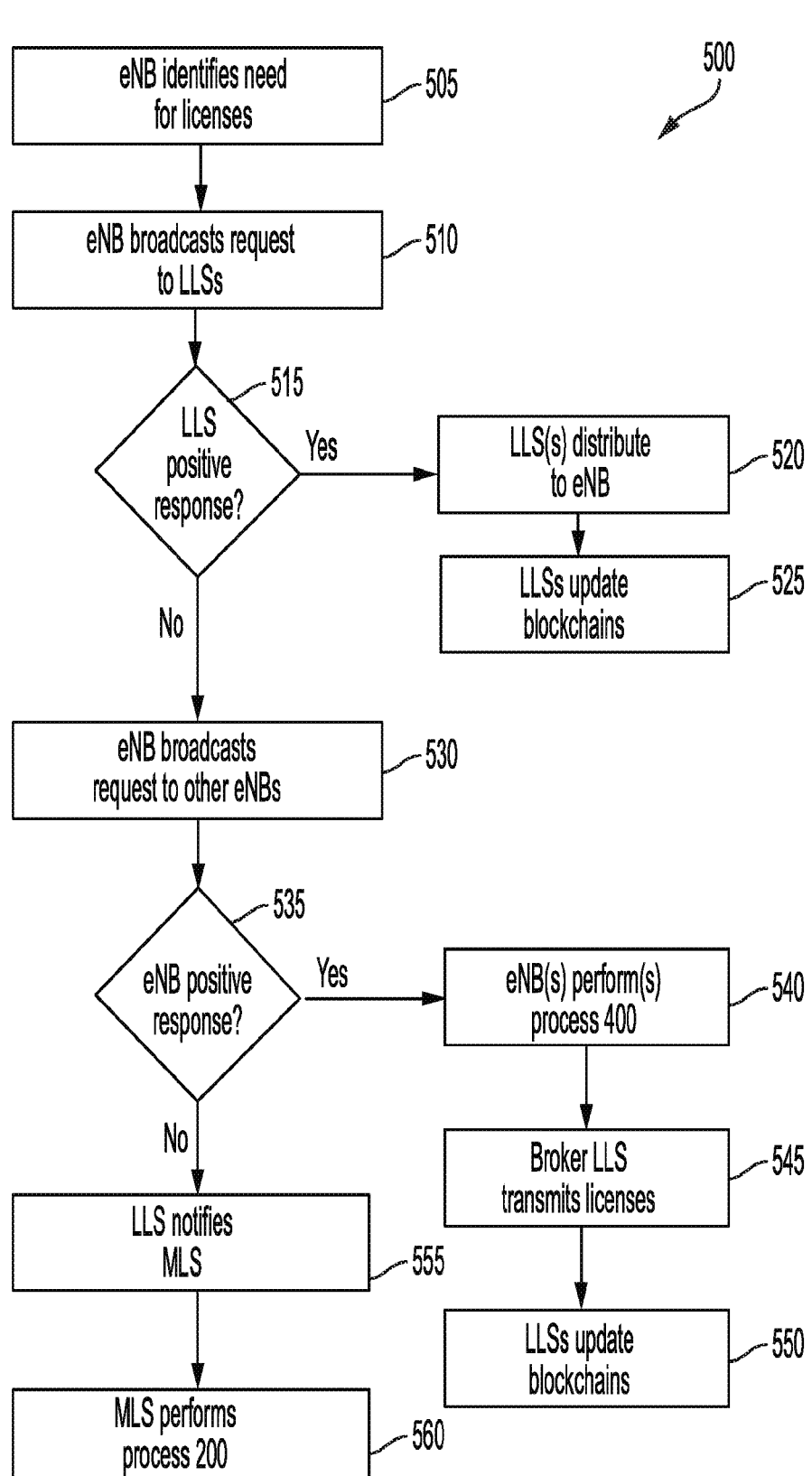
FIG. 5 illustrates an exemplary process for securely rectifying a need for additional connection licenses according to the disclosure.

FIG. 5 illustrates an exemplary process 500 by which a virtual eNodeB 115 in need of additional capacity in the form of connection licenses may obtain them through different sources within system 100. Process 500 may be executed not only by an existing virtual eNodeB 115 that detects a current or pending shortage of connection licenses, it may also be executed by a newly instantiated virtual eNodeB 115 that has been added to the mobile network in anticipation of an increase in demand for connectivity. Examples of this might include an office complex before Monday morning rush hour, or a stadium before a major event.

In step 505, a given virtual eNodeB 115 identifies a need for connection licenses. It may do so by performing analytics on stored data pertaining to historical demand fluctuation patterns, or it may extrapolate a detected trend increasing connectivity demand Such look-ahead functions are discussed in co-owned U.S. patent application Ser. No. 15/918, 799, which is incorporated by reference as if fully disclosed herein. The anticipated shortfall in connection licenses may include factors such as types of connections (e.g. high/low data rate), and potentially a need for one or more feature licenses (e.g., for Carrier Aggregation or MIMO, etc.). Additionally, the virtual eNodeB 115 may employ 3GPP-specified mechanisms for determining demand, including setting a configurable threshold to send an alarm to agent module 117 if the demand has gone above it (e.g., 90% of configured maximum capacity). This mechanism may use the standard PM-Stat files that are generated periodically and transmitted to the core network via a northbound interface (not shown) that is also specified by 3GPP. Further, agent 117 or orchestrator 155 may trigger the generation of a PM-Stat file, as mentioned above, as warranted. It will be understood that such variations are possible and within the scope of the disclosure In step 510, virtual eNodeB 115 broadcasts a request for connection licenses to all of the local license servers 110. The request may include the number of needed connection licenses and may include required data rates and/or one or more required eNodeB feature licenses.

In step 515, each local license server 110 determines if it has sufficient connection licenses in its possession to be able to service the request from the requesting virtual eNodeB 115. This may involve coordination among local license servers 110 to proportionally respond to the requesting virtual eNodeB 115. If one or more of the local license servers 110 has sufficient available connection licenses to meet the demand of requesting virtual eNodeB 115, process 500 may proceed to step 520, in which the one or more local license servers 110 fulfill the demand.

In step 520, if one local license server 110 has enough connection licenses to meet the request, it transmits the connection license information to the requesting virtual eNodeB 115 over bus 120. If more than one local license server 110 are required to meet the request, one local license server 110 may designate itself as broker and coordinate the transfer of required connection licenses from the offering local license servers 110 to the requesting virtual eNodeB 115. The broker local license servers 110 may coordinate the response whereby those local license servers 110 with a greater reserve of connection licenses may provide proportionally more connection licenses than those whose reserve is not as extensive. It will be understood that various approaches to this inter-server coordination are possible and within the scope of the disclosure. In the case of coordinated local license servers 110, each may transit their respective connection licenses to the requesting virtual eNodeB 115 over bus 120.

In step 525, on receipt of the connection licenses from the one or more providing local license servers, the requesting virtual eNodeB 115 may broadcast information to the local license servers 110 over bus 120 indicating successful transition of ownership. In response, each local license server 110 may execute instructions to append one or more blocks to their respective blockchains 112 indicating change in ownership of the connection licenses, and performing the requisite hashes.

Returning to step 515, if none of the local license servers 110 are able to service the request from requesting virtual eNodeB 115, process 500 may proceed to step 530, in which requesting virtual eNodeB 115 may broadcast a request over bus 120 to the other virtual eNodeBs 115 requesting a required number of connection licenses, and potentially their corresponding capabilities. In a variation, one of the local license servers 110 may designate itself as a broker and broadcast this message to the other virtual eNodeBs 115.

In step 535, if one or more of the virtual eNodeBs 115 responds over bus 120 indicating that it has available connection licenses, ("offering" virtual eNodeBs) it may respond to the requesting virtual eNodeB 115 (or to broker local license server 110) that it has sufficient connection licenses to service the request. In a variation, more than one offering virtual eNodeBs 115 may coordinate in a response, in a process similar to the coordination done by the local license servers 110 in step 520, with the broker local license server 110 performing the coordination. If the response is positive, process 500 proceeds to step 540.

In step 540, the one or more offering virtual eNodeBs 115 executes process 400 to transmit its available connection licenses to the designated broker local license server 110.

In step 545, the broker local license server 110 transmits the connection licenses received from the offering virtual eNodeBs 115 to the requesting virtual eNodeB 115.

In step 550, the requesting virtual eNodeB 115, having received the connection licenses from broker local license server 110, broadcasts information to the local license servers 110 over bus 120 indicating the change in ownership of the connection licenses. Each local license server 110 and the master license server 105 may update their respective blockchains 112 accordingly as described above.

Returning to step 535, if none of the virtual eNodeBs 115 have available connection licenses to respond to requesting virtual eNodeB 115, then process 500 may proceed to step 555, in which broker local license server 110 may transmit a message to master license server 105 indicating that more connection licenses are needed.

In step 560, master license server 105 may either allocate and distribute additional connection licenses to the local license servers 110 as done in step 220 and 225. Alternatively, if master license server 105 does not have any additional pooled connection licenses, it may contact license provider 130 to request more connection licenses.

Variations to the above system and processes are possible. For example, master license server 105 may optionally not have a blockchain implementation 112, in which case only the local license servers 110 coupled to bus 120 identify and log transactions in their respective blockchains 112 and synchronize among each other.

System 100 may offer a network operator the ability to flexibly add capability to its network if net network traffic increases to where various virtual eNodeBs 115 experience a simultaneous shortage of connection licenses. In this case, master license server 105 may notify license provider 130 to request and/or purchase additional connection licenses. The request may include further eNodeB capabilities encapsulated in feature licenses and/or capabilities tied to each connection license, such as data rate, etc. Once the master license server 105 has received the additional connection licenses, it may distribute them to the local license servers 110 according to step 225 in process 200, after which each local license server 110 may further allocate and distribute the new connection licenses to virtual eNodeBs 115 according to step 230. One distinction is that the master license server 105 may append its master table with the newly acquired connection licenses, whereas the local license servers might not append their respective master tables, but instead update their respective blockchains 112 once each virtual eNodeB 115 reports its successful acquisition of its new connection licenses. If the blockchain 112 implementation of FIG. 3C is deployed, wherein each block in the blockchain 112 is an updated copy of the original master table, then the latest block master table may be appended with the new connection licenses along with information identifying their new owners.

In an exemplary variation of system 100, each local license server 110 may maintain a table of transactions, listing each connection license and its current owner. The table may also include a transaction number corresponding to the block in its blockchain 112 in which the owner (local license server 110 or virtual eNodeB 115) took ownership of the given connection license. This variation may be implemented in conjunction with the blockchains illustrated in FIGS. 3A and 3B. It would not be necessary for the implementation of FIG. 3C because the latest block in that blockchain 112 is an up-to-date list of each connection license and its current owner. In this example, each local license server 110 may update its table with each transaction that it appends to its blockchain 112. Further, each local license server 110 may periodically confirm its table by comparing it to various blocks within its blockchain and confirming that the entry is correct, using a process substantially similar to the verification of ownership step 415 of process 400. It will be understood that such variations are possible and within the scope of the disclosure.

Each of the transmissions or broadcasts described above may include a digital signature of the sending entity (e.g., local license server 110, virtual eNodeB 115, etc.), enabling the recipient to confirm that the sender is recognized and trusted. The use of PKI and digital signatures may prevent a malicious entity from, for example, introducing a new virtual eNodeB 115 or local license server 110 into system 100 with the intention of executing a denial of service attack by introducing false connection licenses and/or draining system 100 of connection licenses by attempting to perform process 500 using its intruding virtual eNodeB. However, the use of PKI and digital signatures might not protect system 100 from two other types of malicious attacks: copying a trusted virtual eNodeB 115, including its PKI information; and hacking into and taking control of a trusted virtual eNodeB 115.

In the former case in which a malicious entity makes a copy of an existing virtual eNodeB 115, an intruder might be identified because even though the copied virtual eNodeB 115 may be identical to its original, its IP address will be different. In this case, bus master 125 may maintain a list of registered IP addresses (compiled in step 215 above) and may use this to confirm the identity of each of the trusted virtual eNodeBs 115 and local license servers 110. This may enable detection of the copied virtual eNodeB 115 and prevent it from harming the system 100. The same would be true if someone copied a local license server 110 for the purposes of disrupting the network of system 100, given that the bus master 125 may maintain a list of the IP addresses of the local license servers 110 as well.

In the latter case, in which an entity hacks into and gains access to a virtual eNodeB 115, this may be identified and caught by a periodic audit process of the virtual eNodeBs 115 (described below). A hacker might infiltrate an existing virtual eNodeB 115 to either disable or diminish the capability of the virtual eNodeB 115, and/or to inflict harm on the broader network of system 100. In the former case, in which the intruder seeks to disable or harm the particular virtual eNodeB 115, the intruder might alter the connection license information in agent 117, e.g., eliminate the capabilities of the connection licenses it has (e.g., make them all low data rate, or switch off licensed eNodeB features like Carrier Aggregation, CBRS, or MIMO); or the hacker might try to offload an inordinate number of connection licenses to disable a very active virtual eNodeB. In the latter case, the intruder may otherwise (or additionally) use its malicious control of a given virtual eNodeB 115 to harm the network of system 100. For example, a hacker might request an inordinate number of connection licenses for itself, thereby denying them to the rest of system 100 (denial of service); or the hacker might try to release duplicate connection licenses into the network of system 100.

A periodic audit procedure may help identify anomalies in system 100, including those that might be due to an attack in which an intruder has taken control of a virtual eNodeB 115.

Figure 6:
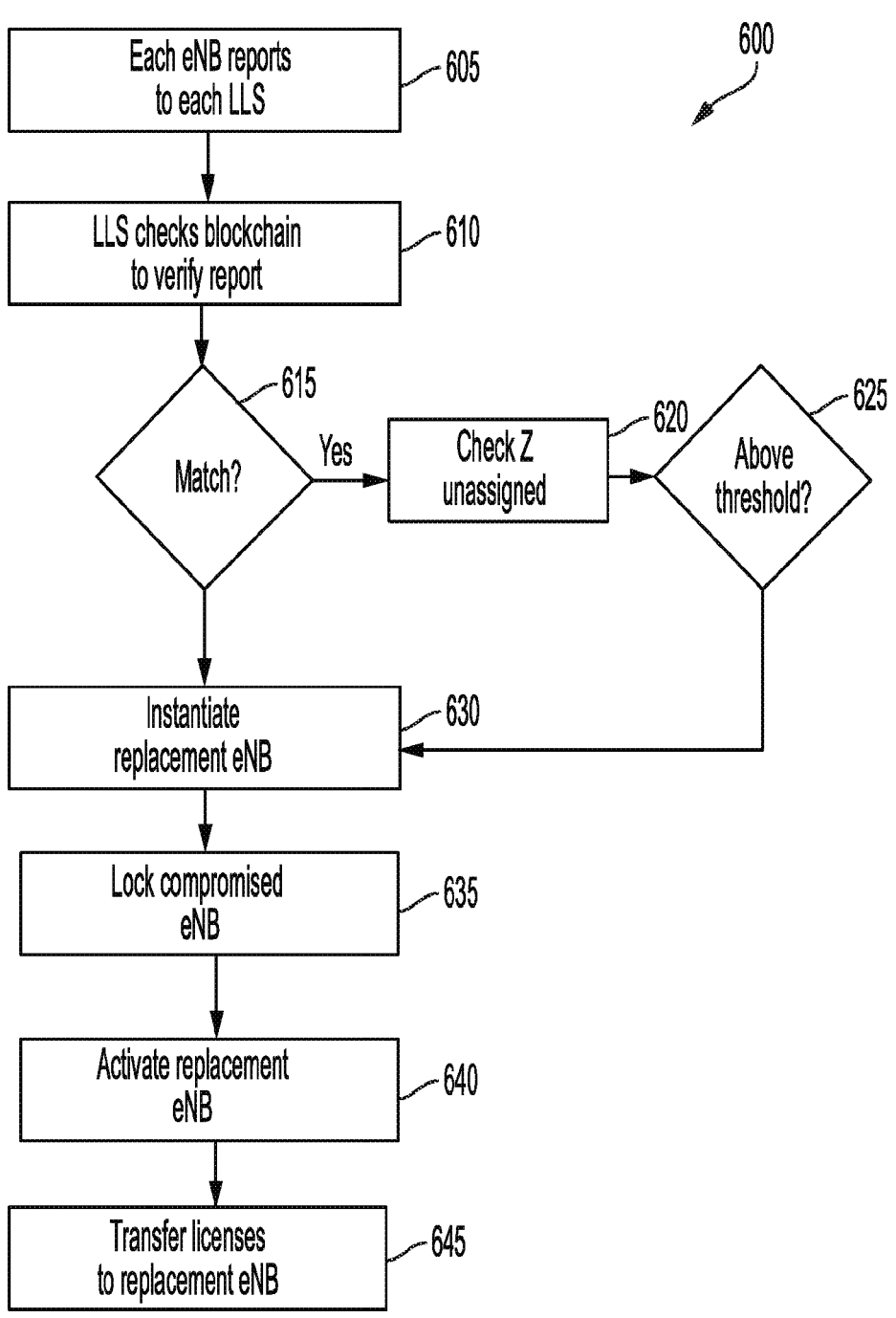
FIG. 6 illustrates an exemplary process for performing a periodic audit of each of the plurality of virtual eNodeBs.

FIG. 6 illustrates an exemplary process 600 for periodically auditing the virtual eNodeBs 115 according to the disclosure. Process 600 may be performed daily, weekly, and/or on an as-needed basis. Audit process 600 may preferably be performed during hours when network traffic is expected to be at its lowest, e.g., at 3:00 am.

In step 605, each virtual eNodeB 115 broadcasts an audit report on bus 120 to the local license servers 110. The audit report may include the number of connection licenses currently in possession of the broadcasting virtual eNodeB 115 and may further include the number of assigned (or unassigned) connection licenses among those currently in possession, along with their corresponding data rates (if applicable). The audit report may also include the numbers of each of its connection licenses. The audit report may further include the feature licenses in possession of the broadcasting virtual eNodeB 115, which may include licensed MIMO, Carrier Aggregation, EIRP, and CBRS capabilities.

In step 610, each local license server 110 reviews its respective blockchain 112 to determine the number of connection licenses the broadcasting virtual eNodeB 115 should have, based on recorded transactions. Depending on the specific blockchain implementation (e.g., FIG. 3A/B/C), this may involve either traversing the blockchain 112 or retrieving the information from the last block (FIG. 3C). Each local license server 110 may identify and store in temporary memory the ID number of each connection license determined to be in possession of the broadcasting virtual eNodeB 115. This may include the transaction number. Each local license server 110 may perform this step to its completion. Otherwise, the first local license server 110 to complete the process may broadcast a notice to the other local license servers 110 indicating that they can stop. In this case, the local license server 110 that completed step 610 first may take control of further actions of process 600 regarding the broadcasting virtual eNodeB 115 as the auditing local license server 110.

The local license servers 110 perform step 610 for each of the virtual eNodeBs 115. Accordingly, different local license servers 110 will become the auditing local license server 110 for different virtual eNodeBs 115.

In step 615, the auditing local license server 110 determines if the number of owned connection licenses reported by broadcasting virtual eNodeB 115 matches the number determined by auditing local license server 110 in step 610. If the numbers match, then process 600 proceeds to step 620, in which auditing local license server 110 determines the number of assigned (or unassigned) connection licenses within the owned connection licenses. This is done to identify a situation in which a compromised virtual eNodeB 115 has been successfully taken over and has been requesting and receiving an inordinately large number of connection licenses from system 100. A compromised virtual eNodeB 115 may repeatedly ask for connection licenses according to process 500, thereby performing a denial of service attack by "draining" system 100 of connection licenses and thus hindering performance of the network of system 100.

In step 625, auditing local license server 110 may compare the ratio of unassigned to owned connection licenses. If the ratio is above a certain threshold (e.g., 80%), then it may indicate that the broadcasting virtual eNodeB 115 may be "hoarding" connection licenses as part of a denial of service attack. In this case, the broadcasting virtual eNodeB 115 may be considered compromised. If the ratio is below this threshold, then the auditing license server 110 may terminate process 600. Otherwise, process 600 proceeds to step 630, described below.

Returning to step 615, if the number of owned connection licenses reported by broadcasting virtual eNodeB 115 does not match the number determined by auditing local license server 110 in step 610, then process 600 proceeds to step 630. In this case, the broadcasting virtual eNodeB 115 is considered compromised.

In step 630, local orchestrator module 155 corresponding to the compromised virtual eNodeB 115 instantiates a replacement virtual virtual eNodeB 115. In doing so, the local orchestrator module 155 may employ container technology to instantiate the replacement virtual eNodeB 115, which may include a plurality of (currently inactive) cells corresponding to the cells of the compromised virtual eNodeB 115.

In step 635, the local orchestrator module 155 may lock the cells of compromised virtual eNodeB 115. This may involve the local orchestrator module 155 issuing instructions to the radio remote units 170 coupled to the compromised virtual eNodeB 115 to begin powering down. As each UE 135 connected to the compromised virtual eNodeB 115 detects a drop in signal power, it will identify another cell with a higher detected power level, whereby the other cell may be coupled to a non-compromised virtual eNodeB 115. The connected UEs 135 may then issue instructions to connect to a stronger cell of the non-compromised virtual eNodeB 115 according to procedures defined in the 3GPP specification. Further to this, orchestrator module 155 may issue instructions to a neighboring virtual eNodeB 115 (or to the remotes 170 coupled to the neighboring virtual eNodeB 115) to increase its power. The increased power in the neighboring virtual eNodeB 115, once recognized by the UEs connected to the compromised virtual eNodeB 115, may more assuredly cause the UEs connected to the virtual compromised eNodeB 115 to hand over to the neighboring virtual eNodeB 115. Further to step 635, orchestrator module 155 may issue instructions to the operating system of compute environment 150 to de-instantiate the container of the compromised virtual eNodeB 115.

The result of step 635 is that each of the UEs 135 formerly connected to compromised virtual eNodeB 115 are now connected to one or more non-compromised virtual eNodeBs 115.

In step 640, local orchestrator module 155 activates the replacement virtual eNodeB 115. It may do so by coupling each cell within the replacement virtual eNodeB 115 to the remote units 170 by configuring the fronthaul interface 160 to allocate CPRI slots for the cells of the replacement virtual eNodeB 115, which may be the same slots previously used by the now locked compromised virtual eNodeB 115. Orchestrator module 155 may issue commands to the remote units 170 coupled to replacement virtual eNodeB 115 to power back up to its original (and perhaps licensed) power level.

In step 645, auditing local license server 110 transmits the connection licenses properly owned—as identified in step 610—to the replacement virtual eNodeB 115 via agent 117. At this stage, the UEs 135 formerly connected to compromised virtual eNodeB 115 may connect to replacement virtual eNodeB 115. Once the replacement virtual eNodeB 115 has taken possession of the connection licenses, it may broadcast this information to the local license servers 110, each of which may update their blockchains 112 accordingly.

Each of the local license servers 110 may have the appropriate software modules to support one or more consensus mechanisms for aligning their respective blockchains 112 to each other. In an example, at each audit interval, each local license server 110 may verify its blockchain 112 by recalculating each hash from the genesis block to the most recent transaction. The first local license server 110 to complete this calculation may broadcast a message to the other local license servers 110 indicating that it has finished. The remaining local license servers 110 may then verify the result of the first one competed. If they arrive at a consensus (e.g., >50% in agreement, or a much higher percentage threshold in case of a lower number of local license servers 110) then the blockchain 112 of the first completed license server 110 may be agreed upon as correct. At this point, all of the local license servers 110 may replace its blockchain 112 with the blockchain 112 of the verified first completed local license server 110. For any local license server 110 whose blockchain calculation doesn't match that of the majority (outlier local license server 110), Either one of the other local license servers 110 or the master license server 105 may verify the identity of the outlier local license server 110. If the identity is verified, then the master license server 105 may send a copy of the verified blockchain 112 to the outlier local license server 110 as a replacement. Alternatively, master license server 105 may execute instructions to revoke any licenses currently owned by the outlier local license server 110 and shut it down (or otherwise lock it out of further processing). It will be understood that such variations are possible and within the scope of the disclosure.

Variations to connection license transactions are possible and within the scope of the disclosure. For example, instead of having all eNodeB-eNodeB transactions going through a local license server 110, whereby the local license server becomes the temporary owner of the connection license that is subject to the transaction, the transmitting virtual eNodeB 115 may send the connection license directly to the receiving virtual eNodeB 115. In this case, the transmitting virtual eNodeB 115 may broadcast to the local license servers 110 that it has transferred ownership of the connection license to the receiving virtual eNodeB 115, and the receiving virtual eNodeB 115 may broadcast to the local license servers 110 that it has assumed ownership of the connection license from the transmitting virtual eNodeB 115.

In a variation, once a virtual eNodeB 115 has taken possession of a connection license, its agent 117 may lock that connection for a predetermined period of time, which may be referred to as a locking duration. An example locking duration may be 1 hour and may be shorter or longer. The purpose of the locking duration is to prevent the traffic on bus 120 from becoming too "chatty", in which highly dynamic fluctuations in traffic demand may cause system 100 to become overloaded with excessive transactions on bus 120. Given a specific locking duration, each agent 117 may compensate by using a look ahead function or a configured overhead margin to make sure that it will have enough connection licenses given a dampened transaction response time.

In another variation, system 100 may provide the ability to add a local license server 110 on the fly. In the case of adding a new local license server 110, master license server 105 may coordinate with an appropriate orchestrator 155 and the corresponding operating system of compute environment 150 to instantiate a new local license server 110, which may include using container technology. Once instantiated, the new local license server 110 may register itself with the master license server 105, which may include the exchange of PKI data and the confirmation that the master license server 105 recognizes the digital signature of the new local license server 105. The new local license server 110 may then register itself with the bus master 125, using its PKI data to establish a trusted relationship with the bus master 125, the other local license servers 110, and the virtual eNodeBs 115. Further to this step, the bus master 125 may log and store the IP address of the new local license server 110 to prevent a successfully copied version of the new local license server 110 from gaining access to bus 120. With trusted communications within system 100 established, local license server 110 may receive a copy of blockchain 112 from either the master license server 105 or one of the local license servers 110. Further, master license server 105 may begin allocating connection licenses to the new local license server 110, either directly or via transactions with one or more virtual eNodeBs 115 in which the new local license server 110 has served as a broker local license server.

What is claimed is:

1. A system for protecting a network of virtual wireless base stations, comprising:
   a plurality of license servers, each of the license servers having a blockchain implementation; and
   a plurality of virtual wireless base stations,
   wherein each of the plurality of license servers receives, respectively, an allocation of at least one connection license from amongst a plurality of connection licenses;
   wherein each of the plurality of license servers is in communication with each of the plurality of virtual wireless base stations,
   wherein the blockchain implementation of the license servers secures the network of virtual wireless base stations by maintaining connection license allocation information distributed across the blockchain implementation of the plurality of license servers,
   wherein each of the plurality of license servers allocates a connection license to a designated virtual wireless base station among the plurality of virtual wireless base stations in accordance with the blockchain implementation of the plurality of license servers, and
   wherein a given one of the allocated connection licenses is assigned to a wireless device connecting to the designated virtual wireless base station.

2. The system of claim 1, wherein the plurality of license servers are local license servers, the system further comprising:
   a master license server; and
   a plurality of agent modules,
   wherein each of the plurality of agent modules is associated with a corresponding one of the plurality of local license servers,
   wherein the master license server is in communication with each of the plurality of local license servers, and wherein the plurality of local license servers allocate connection licenses to the plurality of agent modules associated with the plurality of virtual wireless base stations in accordance with the blockchain implementation.

3. The system of claim 2, wherein the master license server is configured to:

obtain a plurality of connection licenses;

allocate the plurality of connection licenses to the plurality of local license servers; and transmit the allocated plurality of connection licenses to each of the plurality of local license servers.

4. The system of claim 3, wherein the master license server is configured to allocate the plurality of connection licenses by generating a master license allocation table.

5. The system of claim 4, wherein the master license server is configured to transmit the master license allocation table to each of the plurality of local license servers.

6. The system of claim 5, wherein each of the plurality of local license servers is configured to receive the master license allocation table and assign it as a genesis block of its corresponding blockchain implementation.

7. The system of claim 6, wherein at least one of the local license servers is configured to distribute an allocated portion of the plurality of connection licenses to a corresponding set of the plurality of agent modules.

8. The system of claim 7, wherein each agent module of the corresponding set of the plurality of agent modules is configured to broadcast transaction information corresponding to the allocated portion of the plurality of connection licenses.

9. The system of claim 8, wherein each of the plurality of local license servers is configured to append its blockchain implementation with the transaction information.

10. The system of claim 9, wherein each of the plurality of local license servers is configured to append its blockchain implementation, wherein each new block in its blockchain implementation corresponds to an ownership transfer of a single connection license.

11. The system of claim 9, wherein each of the plurality of local license servers is configured to append its blockchain implementation, wherein each new block in its blockchain implementation corresponds to an ownership transfer of the connection licenses of a given agent module's allocated portion of the plurality of connection licenses.

12. The system of claim 9, wherein each of the plurality of local license servers is configured to append its blockchain implementation with an updated copy of the master license allocation table, wherein the updated copy of the master license allocation table comprises updated information corresponding to a transfer of ownership of each of the connection licenses.

13. The system of claim 7, wherein each of the plurality of agent modules is configured to assign each of a subset of the allocation portion of the plurality of connection licenses to an active UE (User Equipment) connection.

14. The system of claim 7, wherein the allocation portion of the plurality of connection licenses comprises a feature license corresponding to a licensed virtual wireless base station feature.

15. The system of claim 14, wherein the feature license corresponds to a MIMO (Multiple-Input and Multiple-Output) capability.

16. The system of claim 1, wherein the license allocation information includes information representing a corresponding connection between a wireless device and virtual wireless base station.

17. A method for initializing a secure wireless telecommunications network, comprising:

instantiating a plurality of local license servers;

exchanging a first PM (Public Key Infrastructure) data between each of the plurality of local license servers and a master license server;

registering each of the plurality of local license servers by exchanging a second PKI data between each of the plurality of local license servers;

instantiating a plurality of virtual wireless base stations;

registering each of the virtual wireless base stations by exchanging a third PKI data between each of the plurality of virtual wireless base stations and storing an IP address corresponding to each of the virtual wireless base stations;

obtaining a plurality of connection licenses at the master license server;

allocating the plurality of connection licenses amongst the plurality of local license servers, wherein each of the local license servers has a blockchain implementation;

transmitting information relating to the plurality of allocated connection licenses, from the master license server, to each of the plurality of local license servers; and distributing the plurality of allocated connection licenses to the plurality of virtual wireless base stations, wherein the distributing includes generating a plurality of transactions in accordance with the blockchain implementation of the plurality of local license servers, wherein the blockchain implementation of each of the local license servers secures the plurality of virtual wireless base stations by appending an indication of each of the plurality of transactions to each blockchain implementation, and wherein at least one of the allocated connection licenses distributed to a designated one of the plurality of virtual wireless base stations is assigned to a wireless device connecting to the designated virtual wireless base station.

18. The method of claim 17, wherein registering each of the plurality of local license servers comprises: exchanging the second PKI data between each of the plurality of local license servers and a master bus.

19. The method of claim 18, wherein registering each of the virtual wireless base stations comprises: exchanging the third PKI data between each of the plurality of virtual wireless base stations and the master bus.

20. The method of claim 17, wherein instantiating the plurality of virtual wireless base stations comprises instantiating a plurality of agent modules, each of the plurality of agent modules corresponding to one of the plurality of virtual wireless base stations.

21. The method of claim 17, further comprising designating each of the connection licenses as one of assigned and unassigned, wherein each of the assigned connection licenses corresponds to an active UE connection.

22. The method of claim 17, wherein the appending each of the plurality of transactions to each blockchain implementation comprises appending each blockchain implementation with a plurality of blocks, wherein each of the plurality of blocks corresponds to a transfer of ownership of a single connection license.

23. The method of claim 17, wherein the appending an indication of each of the plurality of transactions to each blockchain implementation comprises appending each blockchain implementation with a plurality of blocks, wherein each of the plurality of blocks corresponds to a transfer of ownership of an allocation of connection license to a given virtual wireless base station.

24. The method of claim 17, wherein the appending each of the plurality of transactions to each blockchain implementation comprises:

updating a master allocation table with a transfer of ownership of each connection license to generate a new block; and appending each blockchain implementation with the new block.

25. The method of claim 17, wherein the blockchain implementation of each of the local license servers further secures the plurality of virtual wireless base stations by maintaining connection license allocation information distributed across the blockchain implementation of the plurality of license servers, the connection license allocation information including information representing a corresponding connection between a wireless device and virtual wireless base station.

26. A non-transitory memory encoded with machine readable instructions, which when executed by one or more processors, cause the one or more processors to perform a process for initializing a secure wireless telecommunications network, the process comprising:

instantiating a plurality of local license servers;

exchanging a first PKI (Public Key Infrastructure) data between each of the plurality of local license servers and a master license server;

registering each of the plurality of local license servers with a bus master, wherein the registering each of the plurality of local license servers includes exchanging a second PM data between each of the plurality of local license servers and the bus master;

instantiating a plurality of virtual wireless base stations;

registering each of the virtual wireless base stations with the bus master, wherein the registering each of the plurality of virtual wireless base stations includes exchanging a third PM data between each of the plurality of virtual wireless base stations and the bus master, and storing an IP address corresponding to each of the virtual wireless base stations;

obtaining a plurality of connection licenses from a master license server;

allocating the plurality of connection licenses to each of the plurality of local license servers, wherein each of the local license servers has a blockchain implementation;

transmitting the plurality of allocated connection licenses, from the master license server, to each of the plurality of local license servers; and distributing the plurality of allocated connection licenses to the plurality of virtual wireless base stations, wherein the distributing includes generating a plurality of transactions in accordance with the blockchain implementation of the plurality of local license servers, wherein the blockchain implementation of each of the local license servers secures the plurality of virtual wireless base stations by appending an indication of each of the plurality of transactions to each blockchain implementation, and wherein at least one of the allocated connection licenses distributed to a designated one of the plurality of virtual wireless base stations is assigned to a wireless device connecting to the designated virtual wireless base station.

27. The non-transitory memory of claim 26, wherein the blockchain implementation of each of the local license servers further secures the plurality of virtual wireless base stations by maintaining connection license allocation information distributed across the blockchain implementation of the plurality of license servers, the connection license allocation information including information representing a corresponding connection between a wireless device and virtual wireless base station.

* * * * *